Aug. 22, 1961  R. H. LAMAR  2,996,826
VARIABLE COLOR ARTIFICIAL FISHING LURES
Filed May 19, 1958
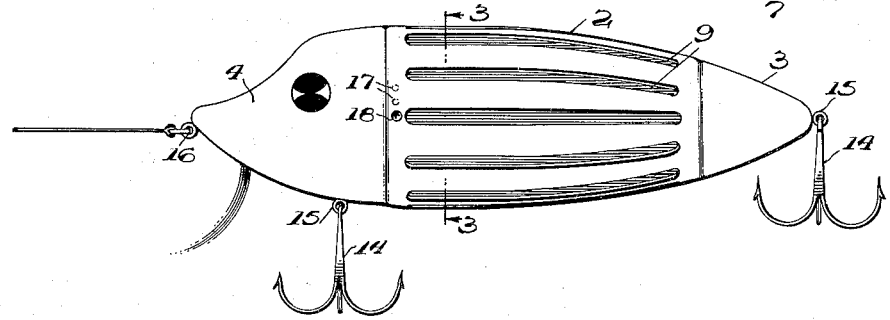
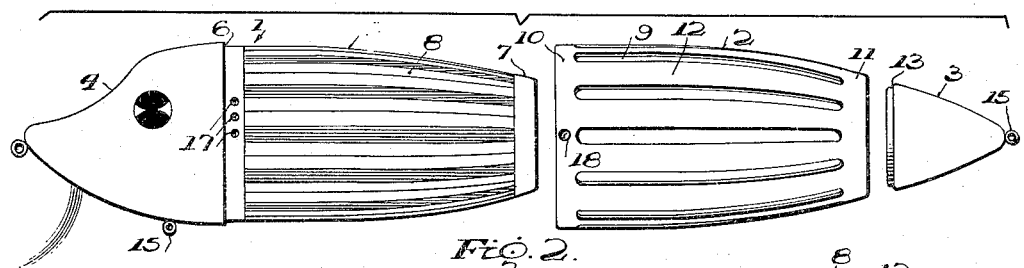
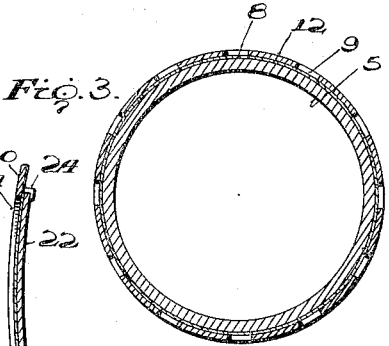
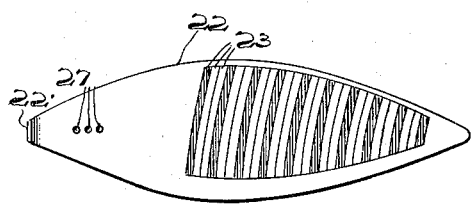
INVENTOR
Ralph H. Lamar
BY W. J. Eccleston,
ATTORNEY

2,996,826
VARIABLE COLOR ARTIFICIAL FISHING LURES
Ralph H. Lamar, Waipio, Oahu, Hawaii (Hq. U.S. Army, Hawaii, 25th Infantry Division, Q.M., APO 957, San Francisco, Calif.)
Filed May 19, 1958, Ser. No. 736,410
3 Claims. (Cl. 43—42.32)
(Granted under Title 35, U.S. Code (1952), sec. 266)

The invention described herein, if patented, may be manufactured and used by or for the Government for governmental purposes, without the payment to me of any royalty thereon.

This invention relates to fish lures and has for its primary object to provide a lure of relatively inexpensive construction which may be readily converted from one color to another as may be desired.

Customarily, fishermen find it necessary to carry a plurality of lures each having a different color for use under varying conditions. In addition to requiring considerable carrying space, much time and labor are required in removing a lure of one color from the line and selecting and attaching a lure of the preferred color. Heretofore, attempts have been made to reduce the number of lures required by providing a single lure body in combination with a plurality of interchangeable shells of different colors. But in this arrangement also, additional space is required for the several shells and considerable time and labor are required in locating the desired color and installing it on the lure body after removing the shell previously used. Also, there is the possibility of loss or misplacement of one or more of the shells.

Each and all of the foregoing disadvantages in providing fish lures of different colors are eliminated by the present invention by means of which a single lure body and its permanently attached sleeve may be readily and quickly manipulated to change from one color to another as desired.

Other objects and advantages of the invention will be apparent from the following description when taken in connection with the accompanying drawings in which, FIG. 1 is a side elevational view of a preferred form of the invention;

FIG. 2 is an exploded view showing the several elements in elevation with the gang hooks removed;

FIG. 3 is a transverse sectional view taken on line 3—3 of FIG. 1 and looking in the direction of the arrows;

FIG. 4 is a plan view of a modified form of the invention embodied in a spoon or the like;

FIG. 5 is an elevational view of the slide member bearing the color stripes; and FIG. 6 is a transverse sectional view taken on line 6—6 of FIG. 4.

Referring to the drawings in greater detail and by reference numerals, as applied to FIGURES 1 and 2, the body of the lure is indicated generally by the numeral 1, the oscillatable sleeve by the numeral 2; and the tail end of the lure by the numeral 3.

The body of the lure which is indicated by the numeral 1 is provided with a head portion 4, a cylindrical main body 5 which is slightly reduced at its forward end to provide a rabbeted portion 6 and a rear bearing portion 7. In the present illustration, this body portion is provided with a plurality of series of colors, such as red, green, and yellow alternately arranged longitudinal stripes 8.

The oscillatable sleeve 2 is of substantially cylindrical form and of a size to snugly engage over the body portion 5 of the lure. This sleeve is provided with a series of longitudinal openings or windows 9 which extend to points adjacent the front and rear ends of the sleeve but leave unbroken portions 10 and 11 of circular form. These slots or windows 9 are of a width and length corresponding to the width and length of the individual colored stripes 8 on the body 5 and, inasmuch as the present illustration is designed for three different colors, the distance between the slots or windows 9 which is indicated by the numeral 12 is of a width corresponding to two of the colored stripes on the body 5. Both the lure body 1 and the oscillatable sleeve 2 are hollow, as clearly indicated in FIG. 3, and they may be formed of any desired plastic or other preferred material.

When the oscillatable sleeve 2 is applied to the body of the lure, the portion 10 will be seated on the rabbeted portion 6 of the lure body and the dimensions are such that the oscillatable sleeve 2 and the head portion 4 of the body of the lure will be substantially flush as indicated in FIG. 1, and the plain band portion 11 of the sleeve will rest on the plain band portion 7 of the lure body 5. When thus assembled, the tail end portion 3 of the lure which is provided with a rabbeted portion 13 is inserted within the hollow rear end of the lure body 1 and adhesively or otherwise secured in position, it being understood that here also the tail portion 3 will be flush with the oscillaable sleeve 2, as clearly indicated in FIG. 1.

The lure as thus assembled may be provided with the usual gang hooks 14 secured to the forward and rear portion of the lure by the usual eyes 15 and the head portion of the lure is provided with a line-attaching eye 16. The rabbeted portion 6 of the lure body 5 in the present instance is provided with three circular depressions or indentations 17 arranged in series and spaced apart a distance corresponding to the width of the colored stripes 8 on the lure body. For cooperation with these indentations 17 there is provided an inwardly directed nib 18 formed on the annular bearing portion 10 of the oscillatable sleeve 2. When the parts of the lure are assembled into the completed fishing lure as shown in FIG. 1, the inwardly directed nib 18 is positioned to engage any one of the series of three indentations 17 on the lure body depending upon which of the three colors the fisherman selects for use. Thereafter, if it is desired to change the color of the lure, it may be rotated to the right or left so as to bring the desired one of the three colors of the present illustration into registration with the longitudinal slots 9 of the oscillatable sleeve 2 and the sleeve will be retained in the selected position by means of the nib 18 registering with the selected indentation 17. The lure may then be used in the regular and conventional manner of any plug type fish hook.

In the modified form of the invention shown in FIGS. 4, 5, and 6 the lure body is in the form of a spoon-like plate 20 of suitable curvature and is provided with a series of transverse slots or windows 21 for cooperation with a spoon-like plate or slide member 22 provided with three series of color stripes 23.

The concave side of the spoon 20 is provided with guideways 24 and serves as a sleeve in which the slide plate 22 is slidably mounted. In this illustration, the space between the transverse slots or windows 21 in the spoon is indicated by the numeral 25 and, as in the preferred form of the invention, this space is of a width corresponding to the width of two of the stripes so as to cover the two series of stripes which are to remain unexposed at any particular time. One of the two elements of this form of the invention is provided with three indentations 27 and the other element is provided with a nib 26 for cooperation with the indentations 27 so as to lock the slide in any one of the three selected positions so as to convert the lure into any selected one of the three colors to be used at the particular time. A finger grip 22' is provided for facilitating movement of the slide 22.

It will be understood, of course, that in both forms of the invention, the number of different color series used and the form of the color design may vary greatly and the number of indentations 17 and 27 will vary in accordance with the number of colors used in the particular embodiment of the invention. Referring to the spoon type of construction shown in FIGS. 4, 5, and 6, the gang hooks 28 are secured to the rear end of the spoon as indicated by the numeral 29 and the forward end of the spoon is provided with an eye 30 to which the fish line 31 is readily attached.

From the foregoing description taken in connection with the accompanying drawings, it will be apparent to those skilled in the art that I have perfected a relatively simple and inexpensive type of fish lure of either the plug type or spoon type which may be readily changed from one color to another as desired without removing and replacing any of the parts as in prior devices of this type, and that the possibility of loss of parts is entirely eliminated.

I claim:

1. A fish lure comprising a pair of nested spoon-like plates slidably mounted relative to each other, a plurality of series of alternately arranged colored stripes on one of said plates, the other plate provided with a series of windows so spaced as to selectively register and thus coincide with said plurality of series of colored stripes, a finger piece at one end of one of said plates for sliding it to an adjusted position relative to the other of said plates, means for releasably locking the plates in the several adjusted positions so as to provide a lure of a preselected color, means for attaching a line to the forward end of the lure, and means for attaching a fish hook to the other end of the lure.

2. A fish lure comprising a pair of spoon-like plates slidably mounted relative to each other, a plurality of series of alternately arranged colored stripes on one of said plates, the other plate provided with a series of windows so spaced as to selectively register and thus coincide with said plurality of series of colored stripes, a projection on one of said plates providing means for sliding it to an adjusted position relative to the other of said plates, a longitudinal series of releasable interlocking means on said plates for locking them in the several adjusted positions so as to provide a lure of a preselected color, means for attaching a line to the forward end of the lure, and means for attaching a fish hook to the other end of the lure.

3. A fish lure according to claim 2, wherein the plurality of series of alternately arranged colored stripes are disposed transversely of the plate, and wherein the series of windows in the other plate are also arranged transversely thereof.

References Cited in the file of this patent

UNITED STATES PATENTS

| | | |
|---|---|---|
| 341,261 | McHarg | May 4, 1886 |
| 1,288,118 | Morian | Dec. 17, 1918 |
| 1,600,653 | Steenstrup | Sept. 21, 1926 |
| 1,740,335 | Cowan | Dec. 17, 1929 |
| 2,213,701 | Haselwood | Sept. 3, 1940 |
| 2,627,134 | Fitzgerald | Feb. 3, 1953 |
| 2,796,693 | Gunterman | June 25, 1957 |
| 2,884,732 | Bailer | May 5, 1959 |